United States Patent
Tsuboka et al.

(10) Patent No.: US 8,132,010 B2
(45) Date of Patent: Mar. 6, 2012

(54) AUTHENTICATION SYSTEM

(75) Inventors: Eiichi Tsuboka, Neyagawa (JP); Fumio Daio, Osaka (JP); Hideo Kaiya, Chigasaki (JP)

(73) Assignee: Panasonic Corporation, Osaka (JP)

( * ) Notice: Subject to any disclaimer, the term of this patent is extended or adjusted under 35 U.S.C. 154(b) by 169 days.

(21) Appl. No.: 12/586,775

(22) Filed: Sep. 28, 2009

(65) Prior Publication Data

US 2010/0017611 A1 Jan. 21, 2010

Related U.S. Application Data (62) Division of application No. 10/992,282, filed on Nov. 18, 2004, now Pat. No. 7,617,394.

(30) Foreign Application Priority Data

Nov. 19, 2003 (JP) ................................. 2003-388623

(51) Int. Cl.
*G06F 21/00* (2006.01)
(52) U.S. Cl. .............................. 713/168; 726/26; 726/34
(58) Field of Classification Search .................. 713/168; 320/106
See application file for complete search history.

(56) References Cited

U.S. PATENT DOCUMENTS

| | | | | |
|---|---|---|---|---|
| 4,961,142 A | * | 10/1990 | Elliott et al. | 705/73 |
| 2002/0164020 A1 | * | 11/2002 | Mustafa | 380/46 |

* cited by examiner

*Primary Examiner* — Edward Zee
*Assistant Examiner* — Yogesh Paliwal
(74) *Attorney, Agent, or Firm* — Jordan and Hamburg LLP (57) ABSTRACT

An authentication system determines if a counterfeit ineligible unit is installed in a main device. When connected with a battery pack, a notebook PC generates and combines a random number and a function determination signal using a signal combining unit and transmits same to the battery pack. A first function calculation unit calculates the function of the random number. The battery pack has a signal separation unit to separate the combined signal into the random number and function determination signal, and a second function calculation unit to calculate the function of the random number for transmitting back to the notebook PC. A comparison unit compares the calculation results by the first and second function calculation units to determine whether the connected battery pack is an authorized one and denies connection if the pack is an unauthorized one.

3 Claims, 6 Drawing Sheets

AUTHENTICATION SYSTEM

The present disclosure relates to subject matter contained in priority Japanese Patent Application No. 2003-388623, filed on Nov. 19, 2003, the contents of which is herein expressly incorporated by reference in its entirety.

BACKGROUND OF THE INVENTION

1. Field of the Invention

The present invention generally relates to an authentication system for use with a main device capable of being connected with a certain unit selected freely by a user as is typical of a personal computer (PC) being connected with peripheral units such as a printer. More particularly, the invention relates to an authentication system which enables a main device to recognize whether a unit connected thereto is an authorized one in order to prevent any glitch or accident caused by an ineligible unit being connected to the main device.

2. Description of the Related Art

For example, one can carry and use a portable notebook PC (hereinafter referred to as the notebook PC) anywhere they like because the notebook PC generally has a battery pack or a battery power source incorporated therein as a standard unit. The battery pack employed in the notebook PC is composed of rechargeable batteries, and can be repeatedly recharged for reuse, but with a limited service life resulting from degradation caused by charge and discharge cycles, service conditions, storage environments and so on. The battery pack is to be replaced when the rechargeable battery has reached its service life or a battery pack having a larger capacity is desired for more hours of operation of the notebook PC. Although the replacement battery pack should be principally such an authorized one that the maker of the notebook PC approves, the notebook PC may be provided with an unauthorized replacement battery pack commercially available at a lower cost. Even an unauthorized battery pack can serve the notebook PC without causing any problem so long as the pack satisfies electrical requirements.

However, the lithium-ion rechargeable battery that is mainly employed as a rechargeable battery in the battery pack of a notebook PC uses a flammable organic solvent as its liquid electrolyte. It is thus important to ensure safety thereof, which is achieved not only by the rechargeable battery itself but also by a protective circuit for ensuring safety upon occurrence of abnormalities due to some reason. No problem would occur if the unauthorized battery pack has its rechargeable batteries and peripheral configuration equivalent to the authorized one; however, it is practically impossible to provide the entirely equivalent configuration. Accordingly, an inferior configuration is provided for cost-cutting purposes. It is thus necessary to take preventive measures against troubles which may be caused by the notebook PC incorporating an unauthorized battery pack or by the unauthorized battery pack itself.

From the aforementioned viewpoints, such a battery pack has been suggested which has a recognition function for distinguishing an authorized battery pack from an unauthorized one to reject the connection of the unauthorized one to the notebook PC when the unauthorized one has been connected thereto (e.g., Japanese National Publication of Translated Version of PCT Application, Publication No. 9-500520).

Figure 6:
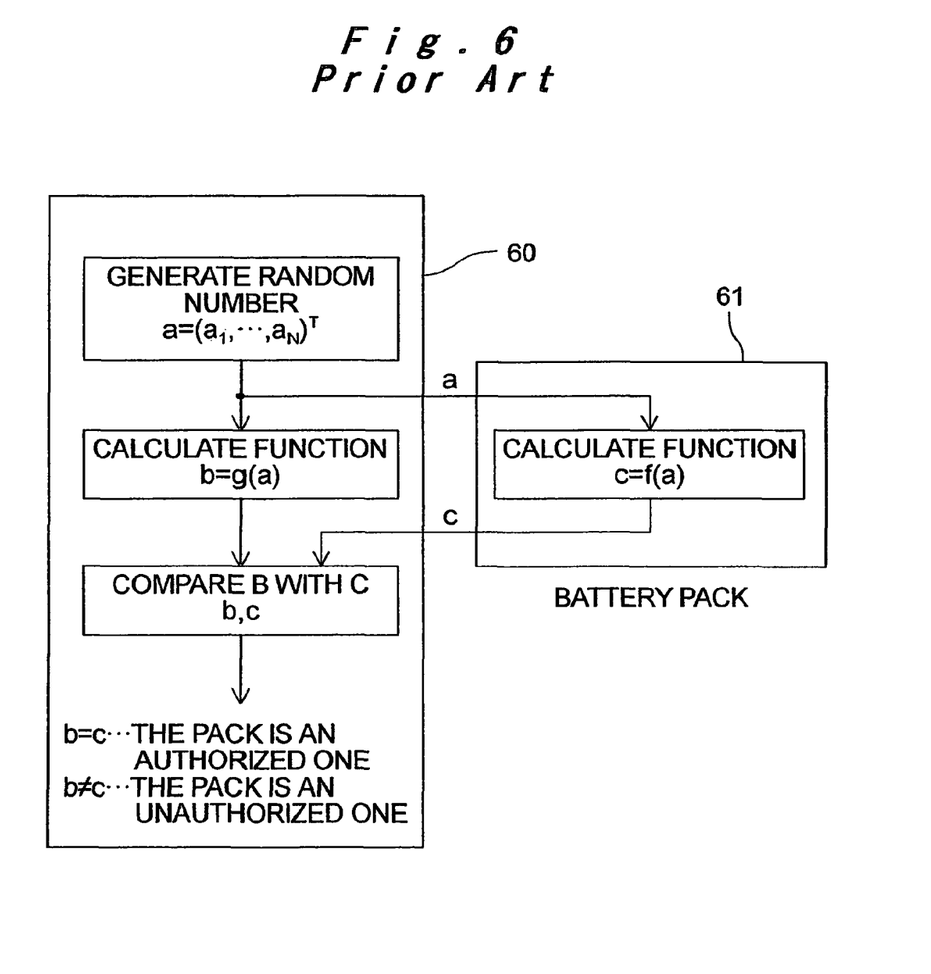
FIG. 6 is a block diagram illustrating the configuration of an authenticating device according to a conventional technique.

As shown in FIG. 6, the conventional technique disclosed in Japanese National Publication No. 9-500520 allows an application circuit (such as a notebook PC) 60 to generate a random number "a" when connected with a battery pack 61. The application circuit 60 then transmits the random number "a" to the battery pack 61 over a connection line, while performing a function calculation with a stored function operation equation $b=g(a)$ using the random number "a." On the battery pack 61 side, the same function calculation is performed as in the application circuit 60 with a stored function operation equation $[c=f(a)]$ using the received random number "a," and the calculation result "c" is sent back to the application circuit 60 side. The application circuit 60 compares the received calculation result "c" with the calculation result "b" obtained in the application circuit 60. If $b=c$, then the application circuit 60 recognizes that the battery pack 61 is an authorized one, thus permitting the connection of the battery pack 61. If $b \neq c$, then the battery pack 61 is determined to be an unauthorized one, thereby deactivating the application circuit 60.

However, the aforementioned conventional technique allows the application circuit 60 and the battery pack 61 to perform the same function calculation, thus making it possible to read the information stored in a memory of the application circuit 60 or the battery pack 61 in order to imitate the function calculation. However, for the battery pack 61 with a microcomputer for performing the function calculation and a memory for storing the calculation procedure being integrated into an IC chip for the purpose of miniaturization, it is very difficult to read out the entirety or a required portion of the information. On the other hand, for the application circuit 60 being a notebook PC, the recognition function which is required only at the time of installation of the battery pack 61 is desirably realized without any unnecessary additional cost. That is, the microcomputer and the operating system (OS) of the notebook PC are desirably provided with functions of generating random numbers and performing the function calculation and a memory for storing the procedure of the function calculation or other procedures. However, copying the contents of the memory on the application circuit 60 side would permit the faking of the battery pack 61.

SUMMARY OF THE INVENTION

The present invention is developed in view of the aforementioned conventional problems. It is therefore an object of the present invention to provide an authentication system which prevents any glitch or accident caused by an ineligible unit being connected to a main device.

In order to achieve the aforementioned object, a first aspect of the present invention provides an authentication system for authentically determining whether an authenticated unit, connected to a main device serving as an authenticating device, has an authorized function. The authentication system is adapted such that when connected with the authenticated unit, the authenticating device allows random number generation means to generate a random number, function determination signal generation means to generate a function determination signal for determining a function form, signal combining means to combine the function determination signal and the random number for transmitting to the authenticated unit, and first function calculation means to calculate a function of the random number as a first calculation result using a determined function form. The authenticated unit allows signal separation means to separate the received combined signal into the function determination signal and the random number, and second function calculation means to calculate a function of the random number as a second calculation result using a determined function form for transmitting the second calculation result back to the authenticating device. The authenticating device compares the first calculation result and the calculation result by the second function calculation means to permit the connection of the authenticated unit if it is detected that [the first calculation result=the second calculation result] or to reject the connection of the authenticated unit if it is detected that [the first calculation result≠the second calculation result].

According to the arrangement of the first aspect of the present invention, when connected with the authenticated unit, the authenticating device allows the signal combining means to combine the generated random number and the function determination signal for transmitting to the authenticated unit. Then, the authenticated unit allows the signal separation means to separate the combined signal into the random number and the function determination signal. Both the authenticating device and the authenticated unit calculate the function of a random number using the function form determined based on the function determination signal to compare both the calculation results. This allows an authorized authenticated unit to perform the signal separation and the function calculation properly, and thus both the calculation results to agree with each other. The authenticating device thus permits the connection of the authenticated unit. On the other hand, when the signal separation and the function calculation are performed improperly, both the calculation results will not agree with each other. As a result, the authenticating device determines that the connected authenticated unit is not an authorized one or is a counterfeit, and thus does not permit the connection. Accordingly, the authenticated unit will not be connected to the authenticating device.

A second aspect of the present invention also provides an authentication system for authentically determining whether an authenticated unit connected to a main device serving as an authenticating device has an authorized function. The authentication system is adapted such that when connected with the authenticated unit, the authenticating device allows random number generation means to generate a random number to store the random number and transmit the random number to the authenticated unit. The authenticated unit allows function determination signal generation means to generate a function determination signal for determining a function form, second function calculation means to calculate a function of the received random number as a second calculation result using a determined function form, and signal combining means to combine the second calculation result and the function determination signal into a combined signal for transmitting back to the authenticating device. The authenticating device allows signal separation means to separate the received combined signal into the second calculation result and the function determination signal and first function calculation means to calculate a function of the stored random number as a first calculation result using the determined function form. The authenticating device then permits the connection of the authenticated unit if it is detected that [the first calculation result=the second calculation result] or rejects the connection of the authenticated unit if it is detected that [the first calculation result≠the second calculation result].

According to the arrangement of the second aspect of the present invention, when connected with the authenticated unit, the authenticating device allows a random number to be generated for transmitting to the authenticated unit. In the authenticated unit, a function of the random number is calculated using the function form determined based on the function determination signal delivered from the function determination signal generation means. Then, the signal combining means combines the calculation result and the function determination signal for transmitting back to the authenticating device. Then, the authenticating device allows the signal separation means to separate the combined signal to calculate a function of the random number using the function form determined based on the function determination signal. For an authorized authenticated unit, a comparison of both the calculation results shows that both the calculation results agree with each other because the function calculation is performed properly and the workings of the signal combination and the signal separation agree with each other. Accordingly, the authenticating device permits the connection of the authenticated unit. On the other hand, when the signal combination and the function calculation are performed improperly, both the calculation results will not agree with each other. As a result, the authenticating device determines that the connected authenticated unit is not an authorized one or is a counterfeit, and thus does not permit the connection. Thus, the authenticated unit will not be connected to the authenticating device.

A third aspect of the present invention also provides an authentication system for authentically determining whether an authenticated unit connected to a main device serving as an authenticating device has an authorized function. The authentication system is adapted such that when connected with the authenticated unit, the authenticating device allows random number generation means to generate a random number and function determination signal generation means to generate a function determination signal for determining a function form to store the random number and the function determination signal, and allows signal combining means to combine the function determination signal and the random number for transmitting to the authenticated unit. The authenticated unit allows signal separation means to separate the received combined signal into the function determination signal and the random number, and second function calculation means to calculate a function of the random number as a second calculation result using a determined function form for transmitting the second calculation result back to the authenticating device. The authenticating device allows inverse-function calculation means to calculate an inverse function of the received second calculation result using a function form determined by the stored function determination signal to compare the stored random number with the inverse function calculation result. The authenticating device permits the connection of the authenticated unit if it is detected that [the random number=the inverse-function calculation result] or rejects the connection of the authenticated unit if it is detected that [the random number≠the inverse-function calculation result].

According to the arrangement of the third aspect of the present invention, when connected with the authenticated unit, the authenticating device allows the generated random number and the function determination signal to be combined and transmitted to the authenticated unit. Then, in the authenticated unit, the signal separation means separates the combined signal into the random number and the function determination signal to calculate a function of the random number using the function form determined by the function determination signal for transmitting back to the authenticating device. The authenticating device calculates the inverse function of the calculation result received from the authenticated unit using the function form determined by the function determination signal to compare the calculation result with the random number. If the authenticated unit has performed the signal separation properly and the calculation of the function of the random number properly, then the calculation result of the inverse function agrees with the random number. Thus, the authenticating device permits the connection of the authenticated unit. On the other hand, when the signal separation and the function calculation are performed improperly, the calculation result of the inverse function and the random number will not agree with each other. As a result, the authenticating device determines that the connected authenticated unit is not an authorized one or is a counterfeit, and thus does not permit the connection. Accordingly, the authenticated unit will not be connected to the authenticating device.

A fourth aspect of the present invention also provides an authentication system for authentically determining whether an authenticated unit connected to a main device serving as an authenticating device has an authorized function. The authentication system is adapted such that when connected with the authenticated unit, the authenticating device allows random number generation means to generate a random number to store the random number and transmit the random number to the authenticated unit. The authenticated unit allows function determination signal generation means to generate a function determination signal for determining a function form, second function calculation means to calculate a function of the received random number as a second calculation result using a determined function form, and signal combining means to combine the second calculation result and the function determination signal into a combined signal for transmitting back to the authenticating device. The authenticating device allows signal separation means to separate the received combined signal into the second calculation result and the function determination signal and inverse-function calculation means to calculate an inverse function of the received second calculation result using a function form determined by the separated function determination signal. The authenticating device then permits the connection of the authenticated unit if it is detected that [the random number=the inverse-function calculation result] or rejects the connection of the authenticated unit if it is detected that [the random number≠the inverse-function calculation result].

According to the arrangement of the fourth aspect of the present invention, when connected with the authenticated unit, the authenticating device allows a random number to be generated for transmitting to the authenticated unit. In the authenticated unit, a function of the random number is calculated using the function form determined by the function determination signal delivered from the function determination signal generation means. Then, the signal combining means combines the calculation result and the function determination signal for transmitting back to the authenticating device. Then, the authenticating device allows the signal separation means to separate the combined signal to calculate the inverse function of the function calculation result using the function form determined by the function determination signal for comparison with the random number. For an authorized authenticated unit, the function calculation is performed properly and the signal combination is performed in agreement with the working of the signal separation means, so that the inverse-function calculation of the function calculation result agrees with the random number. Thus, the authenticating device determines that the authenticated unit is an authorized one and permits the connection of the authenticated unit. On the other hand, when the signal combination and the function calculation are performed improperly, the calculation result of the inverse function does not agree with the random number. As a result, the authenticating device determines that the connected authenticated unit is not an authorized one or is a counterfeit, and thus does not permit the connection. Thus, the authenticated unit will not be connected to the authenticating device.

While novel features of the invention are set forth in the preceding, the invention, both as to organization and content, can be further understood and appreciated, along with other objects and features thereof, from the following detailed description and examples when taken in conjunction with the attached drawings.

DESCRIPTION OF THE PREFERRED EMBODIMENTS

Now, the present invention will be hereinafter described by way of example with reference to the accompanying drawings in accordance with the embodiments. The embodiments are described in relation to an example in which a notebook PC is employed as an authenticating device incorporating the authentication system according to the present invention, and a battery pack installed as a battery power source in the notebook PC is employed as an authenticated unit.

Figure 1:
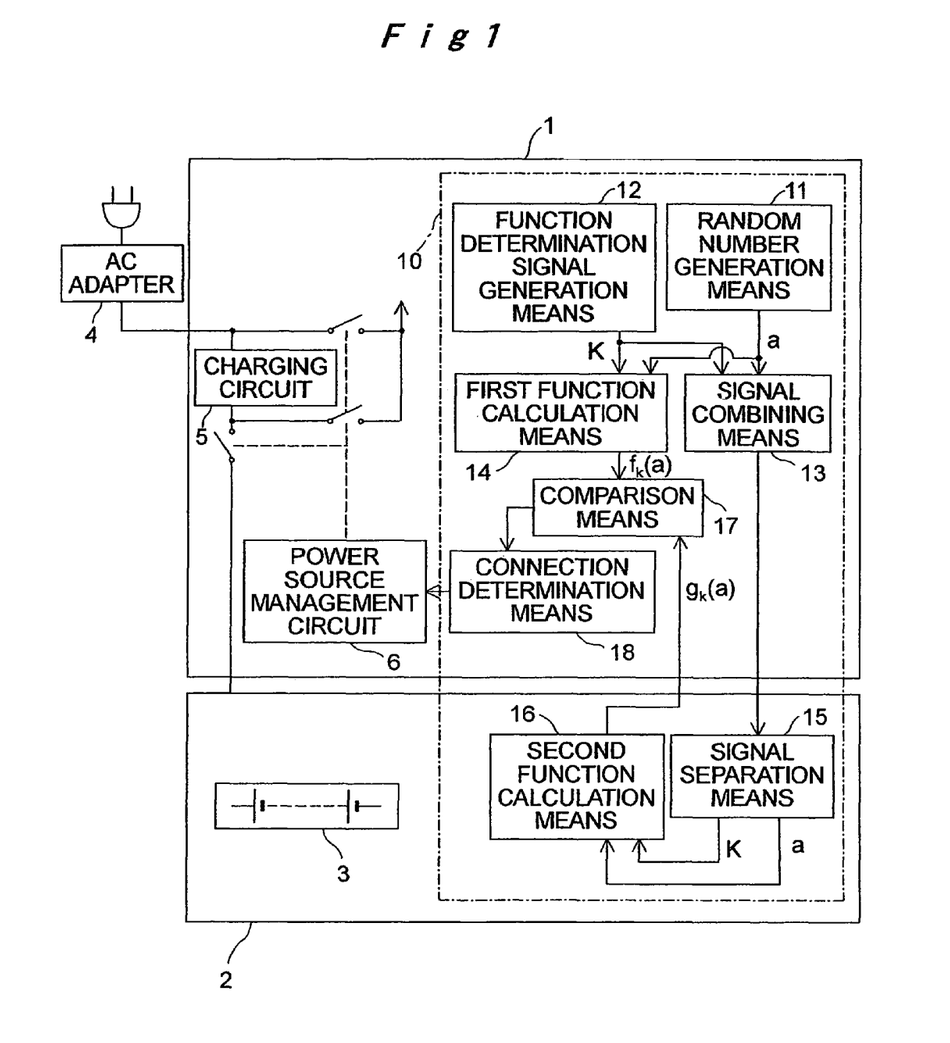
FIG. 1 is a block diagram illustrating the configuration of an authentication system according to a first example.

Referring to FIG. 1, although not explicitly illustrated, a notebook PC (an authenticating device) 1 with a computing unit with a CPU at the center, input means such as a keyboard, and display means such as an LCD operates on an operating system as a personal computer. The notebook PC 1 operates on the DC power obtained through the DC conversion of the commercial power with an AC adapter 4 or the DC power from a battery pack (an authenticated unit) 2. The notebook PC 1 also allows a charging circuit 5 to use the DC power obtained from the AC adapter 4 to recharge rechargeable batteries 3 incorporated into the battery pack 2. A power source management circuit 6 provides control to the switching between the AC adapter 4 and the battery pack 2 for delivery of the operating power and to the recharge power being supplied to the battery pack 2. While power is being supplied from the AC adapter 4, the power source management circuit 6 provides control such that the operating power for the notebook PC 1 is obtained from the AC adapter 4 and the recharge power is supplied to the battery pack 2 in response to the request therefrom.

Although not explicitly illustrated, the battery pack 2 installed detachably in the notebook PC 1 includes a battery protection circuit for protecting the rechargeable battery 3 against overcharging, over-discharging, and over-current, and a remaining-capacity computing circuit for computing a remaining capacity of the rechargeable battery 3. When installed in the notebook PC 1, the battery pack 2 provides power lines and signal transmission lines or a communication bus to the notebook PC 1.

The rechargeable batteries 3 included in the battery pack 2 can be used repeatedly by recharging; however, their service life is limited. When the rechargeable battery 3 has reached its service life, the battery pack 2 is to be replaced. Even when the rechargeable battery 3 has not yet reached its service life, the battery pack 2 may be replaced by a new one having a larger battery capacity for more hours of continuous service. In this case, no problem would arise if the replacement battery pack is an authorized one having the predetermined performance and specifications, and employs rechargeable batteries 3 having the predetermined performance and specifications. However, if the replacement battery pack is an unauthorized one, the occurrence of a glitch or an accident may be expected. Accordingly, it is necessary to provide an authentication system for determining whether the battery pack 2 is an authorized one. Now, descriptions will be given below to examples of an authentication system for recognizing whether the battery pack 2 is an authorized one.

First Example

Referring to FIG. 1, the notebook PC 1 and the battery pack 2 installed therein are provided with an authentication system 10 for recognizing whether the installed battery pack 2 is an authorized one and rejecting the connection of the battery pack 2 if it is not an authorized one. The authentication system 10 includes the authenticating device function provided on the notebook PC 1 side and the authenticated unit function provided on the battery pack 2 side.

On the notebook PC 1 side, provided are random number generation means 11 for generating a random number "a"; function determination signal generation means 12 for delivering a given function determination signal K; signal combining means 13 for combining the random number "a" with the function determination signal K for transmitting to the battery pack 2 as a combined signal; first function calculation means 14 for calculating a function $[f_K(a)]$ of the random number "a" delivered from the random number generation means 11 using a function form corresponding to the function determination signal K provided from the function determination signal generation means 12; comparison means 17 for comparing the calculation result from the first function calculation means 14 with the calculation result received from the battery pack 2 to determine whether the battery pack 2 is an authorized one; and connection determination means 18 for delivering to the power source management circuit 6 a signal of acceptance or rejection of the connection of the battery pack 2 based on the determination result from the comparison means 17.

Figure 2:
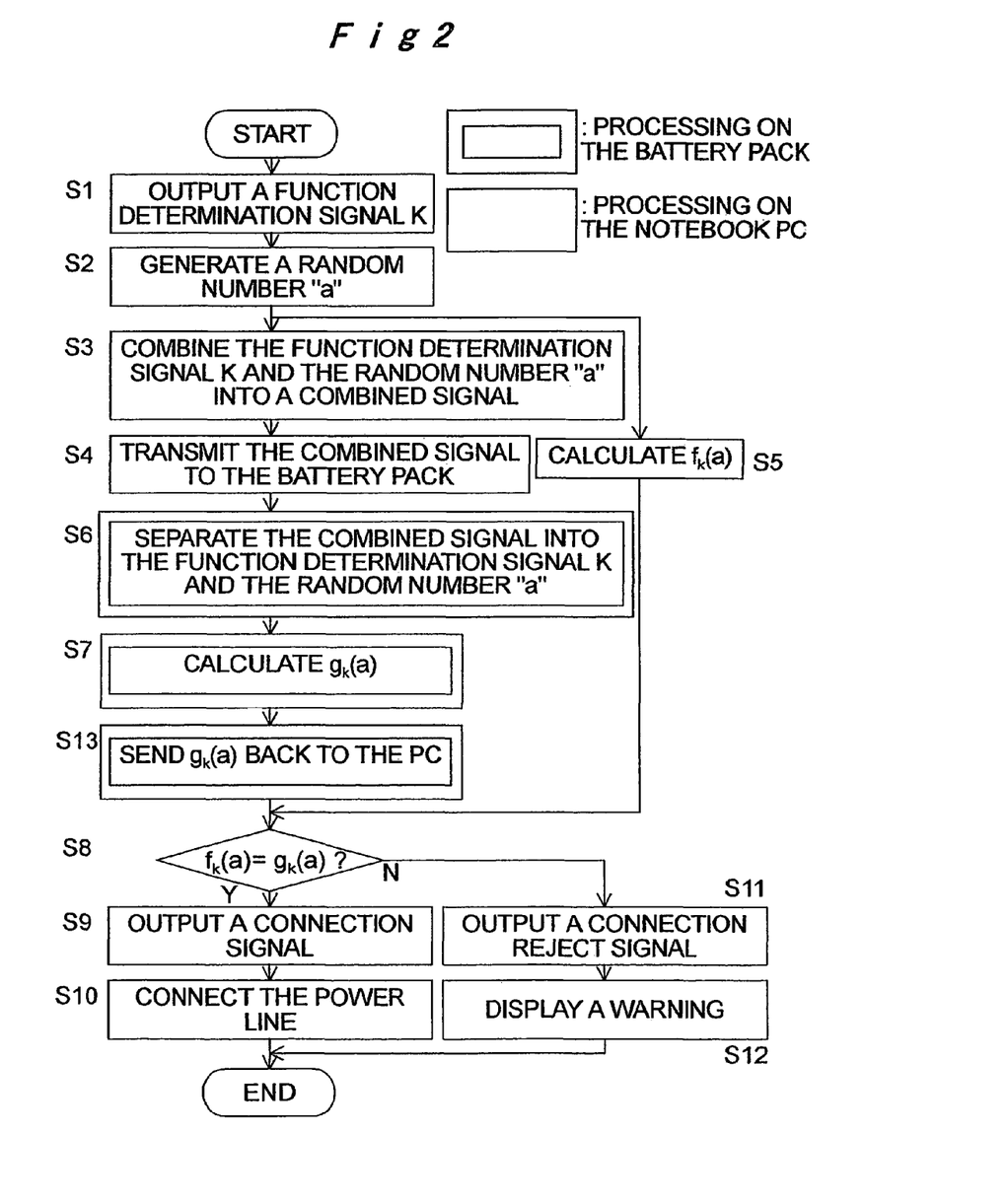
FIG. 2 is a flowchart showing the recognition operation performed by the authentication system.

On the battery pack 2 side, provided are signal separation means 15 for separating the random number "a" and the function determination signal K from the combined signal transmitted from the notebook PC 1, and second function calculation means 16 for calculating a function $[g_K(a)]$ of the random number "a" using a function form corresponding to the function determination signal K separated. The aforementioned communication bus is utilized to transmit signals between the notebook PC 1 and the battery pack 2 within the authentication system 10. The operation procedure of the authentication system 10 for recognizing an authorized unit will now be explained with reference to the flowchart shown in FIG. 2. FIG. 2 shows step numbers of the operation procedure, such as S1 and S2, which agree with those used herein.

Installing the battery pack 2 in the notebook PC 1 causes the authentication system 10 to start operating. First, the function determination signal generation means 12 arbitrarily chooses a function determination signal K for output (S1), and the random number generation means 11 outputs a random number "a" (S2). The random number "a" and the function determination signal K are combined in the signal combining means 13 (S3) for transmitting to the battery pack 2 over the communication bus (S4). The random number "a" and the function determination signal K are supplied to the first function calculation means 14, and the first function calculation means 14 calculates the function $[f_K(a)]$ of the random number "a" using one of a plurality of pre-stored function forms corresponding to the function determination signal K (S5). This calculation result is stored in the comparison means 17.

The battery pack 2 allows the signal separation means 15 to separate the received combined signal into the random number "a" and the function determination signal K (S6) for supply to the second function calculation means 16. The second function calculation means 16 then calculates the function $[g_K(a)]$ of the random number "a" using one of a plurality of pre-stored function forms corresponding to the function determination signal K (S7) to transmit the calculation result back to the notebook PC 1 over the communication bus (S13).

The notebook PC 1 allows the comparison means 17 to compare the calculation result $[f_K(a)]$ by the first function calculation means 14 with the calculation result $[g_K(a)]$ by the second function calculation means 16 (S8). If $[f_K(a)=g_K(a)]$, the notebook PC 1 determines that the battery pack 2 is an authorized one, and delivers a connection signal to the connection determination means 18 (S9). Then, the connection determination means 18 delivers the connection signal to the power source management circuit 6 (S10), which in turn connects the power line between the battery pack 2 and the notebook PC 1 to start recharging the battery pack 2. That is, since the rechargeable battery 3 is more likely to deteriorate during storage in a fully charged condition, a rechargeable battery 3 of a new battery pack 2 is in a not fully charged state. When the battery pack 2 is determined to be an authorized one, the power source management circuit 6 controls the charging circuit 5 to supply the recharge power to the battery pack 2 through the power line connected.

On the other hand, if the comparison means 17 has determined that $[f_K(a) \neq g_K(a)]$, then the connection determination means 18 outputs a connection reject signal to the power source management circuit 6 (S11), so that no power line is connected between the battery pack 2 and the notebook PC 1, and the predetermined procedure causes a warning to appear on the display telling that the pack is an unauthorized one and therefore cannot be used (S12).

The aforementioned authentication system 10 functions not to allow a counterfeit battery pack 2 without authorized rechargeable batteries 3 or authorized functions to connect to the notebook PC 1, thereby preventing glitches or accidents caused by an unauthorized battery pack 2 being installed therein.

To counterfeit the battery pack 2 configured as described above, it is necessary to decode the workings of the signal combination by the signal combining means 13 and the signal separation by the signal separation means 15 as well as the function forms stored in each of the first and second function calculation means 14 and 15. However, since the circuit having a memory for storing calculation procedures is integrated into an IC chip together with the aforementioned remaining-capacity computing circuit, it is very difficult to copy the entire circuit or part thereof. When the same calculation is performed on the battery pack and main device sides as in the conventional technique, the battery pack 2 could be counterfeit by copying the calculation equation from the device side if that on the battery pack side cannot be decoded. However, according to this arrangement, even copying a plurality of function forms stored in the first function calculation means 14 on the notebook PC 1 side would not make it possible to derive the function form to be processed on the battery pack 2 side unless the procedure of determining which function form to use is decoded. It is extremely difficult to decode a program written in machine language to find the function form, thereby making the faking thereof far more difficult as compared with the conventional technique which allows calculation equations to be readily made available by copying.

Second Example

Figure 3:
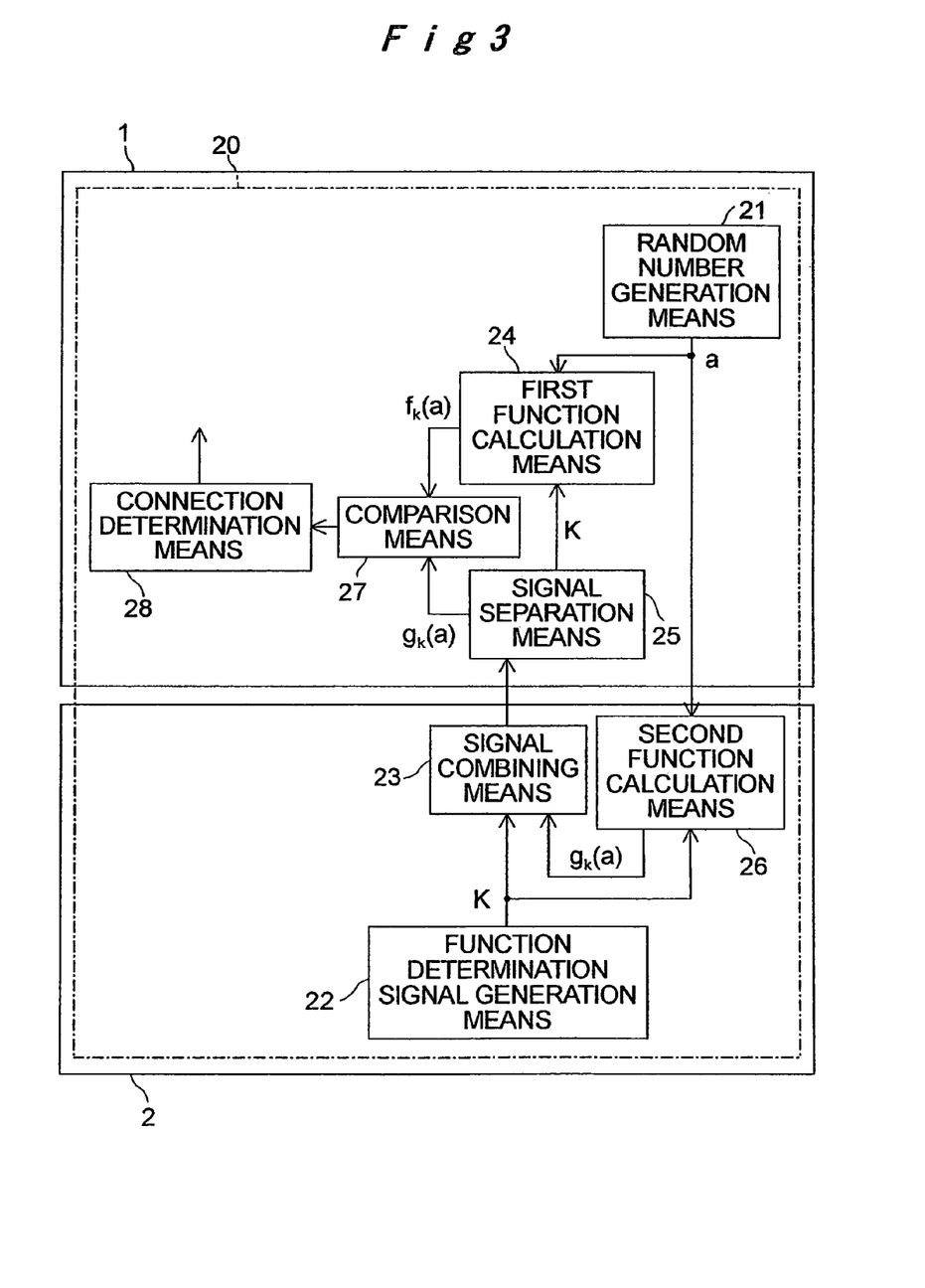
FIG. 3 is a block diagram illustrating the configuration of an authentication system according to a second example.

FIG. 3 shows the configuration of an authentication system 20 according to a second example, in which the basic configuration of the notebook PC 1 and the battery pack 2 are the same as those of FIG. 1.

Referring to FIG. 3, installing the battery pack 2 in the notebook PC 1 causes the authentication system 20 to start operating. First, a random number "a" generated in random number generation means 21 is transmitted to the battery pack 2 and stored in first function calculation means 24.

The battery pack 2 allows second function calculation means 26 to calculate the function $[g_K(a)]$ of the received random number "a" using one of a plurality of pre-stored functions corresponding to the function determination signal K delivered from function determination signal generation means 22. The calculation result $[g_K(a)]$ by the second function calculation means 26 and the function determination signal K are combined in signal combining means 23 for transmitting back to the notebook PC 1.

The notebook PC 1 allows signal separation means 25 to separate the received combined signal into the calculation result $[g_K(a)]$ by the second function calculation means 26 and the function determination signal K. The function determination signal K is supplied to the first function calculation means 24, which in turn calculates the function $[f_K(a)]$ of the random number "a" using one of a plurality of pre-stored function forms corresponding to the function determination signal K. The calculation result $[f_K(a)]$ by the first function calculation means 24 and the calculation result $[g_K(a)]$ by the second function calculation means 26 separated in the signal separation means 25 are supplied to comparison means 27 to determine whether $[f_K(a)=g_K(a)]$.

If $[f_K(a)=g_K(a)]$, the notebook PC 1 determines that the battery pack 2 is an authorized one and allows the comparison means 27 to deliver a connection signal to connection determination means 28, which in turn outputs the connection signal to the power source management circuit 6, thereby allowing a power line to be connected between the battery pack 2 and the notebook PC 1 to start recharging the battery pack 2. On the other hand, if the comparison means 27 has determined that $[f_K(a) \neq g_K(a)]$, the connection determination means 28 outputs a connection reject signal to the power source management circuit 6, so that no power line is connected between the battery pack 2 and the notebook PC 1, and the predetermined procedure causes a warning to appear on the display telling that the pack is an unauthorized one and therefore cannot be used.

The aforementioned authentication system 20 functions not to allow a counterfeit battery pack 2 without authorized rechargeable batteries 3 or authorized functions to connect to the notebook PC 1, thereby preventing glitches or accidents caused by an unauthorized battery pack 2 being installed therein.

Third Example

Figure 4:
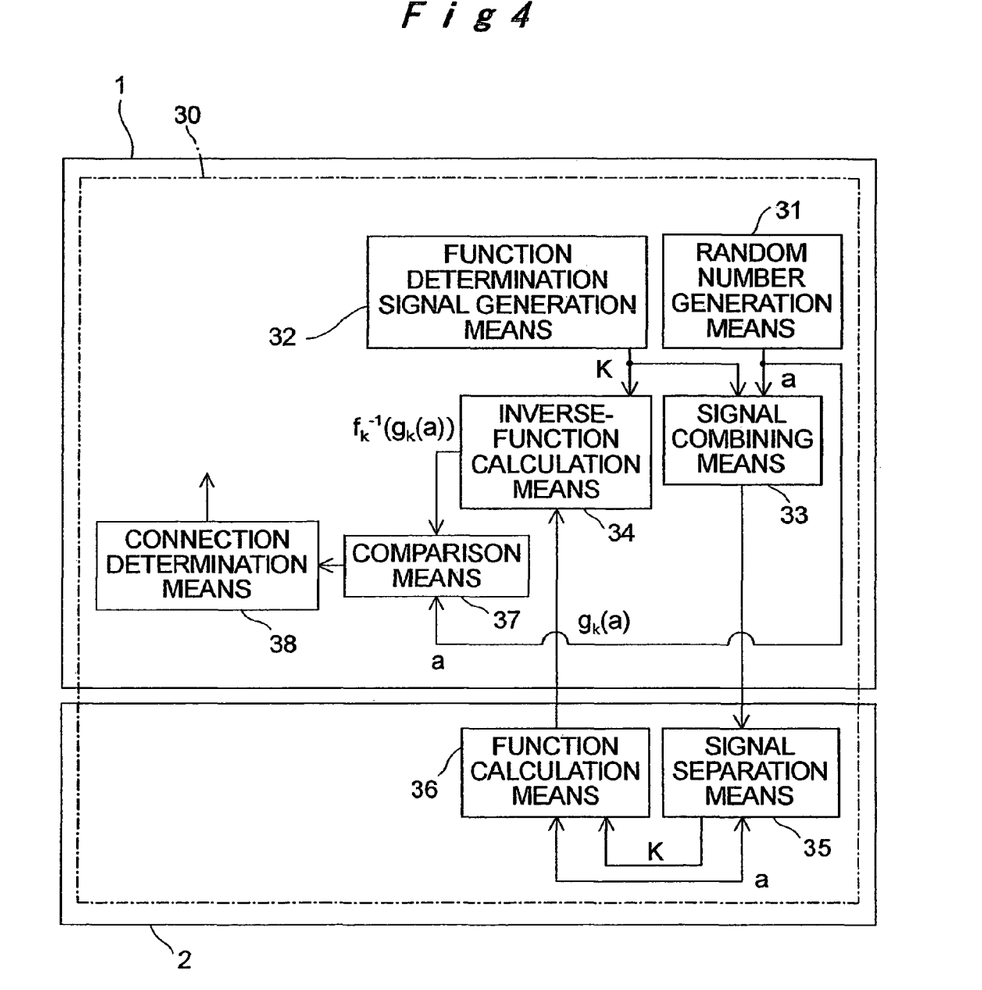
FIG. 4 is a block diagram illustrating the configuration of an authentication system according to a third example.

FIG. 4 shows the configuration of an authentication system 30 according to a third example, in which the basic configuration of the notebook PC 1 and the battery pack 2 are the same as those of FIG. 1.

Referring to FIG. 4, installing the battery pack 2 in the notebook PC 1 causes the authentication system 30 to start operating. First, function determination signal generation means 32 arbitrarily chooses a function determination signal K for output, while random number generation means 31 outputs a random number "a." The random number "a" and the function determination signal K are combined in signal combining means 33 for transmitting to the battery pack 2 over the communication bus. Additionally, the function determination signal K is supplied to inverse-function calculation means 34 for storage, while the random number "a" is stored in comparison means 37.

The battery pack 2 allows signal separation means 35 to separate the received combined signal into the random number "a" and the function determination signal K for supply to function calculation means 36, which in turn calculates the function $[g_K(a)]$ of the random number "a" using one of a plurality of pre-stored function forms corresponding to the function determination signal K to transmit the calculation result back to the notebook PC 1 over the communication bus.

The notebook PC 1 supplies the received calculation result $[g_K(a)]$ from the function calculation means 36 to the inverse-function calculation means 34 to calculate the inverse function $[f_K^{-1}(g_K(a))]$ of the calculation result $[g_K(a)]$ using the function form corresponding to the function determination signal K. The calculation result of the inverse function is supplied to the comparison means 37 to determine whether $[f_K^{-1}(g_K(a))=a]$.

If the comparison means 37 determines that $[f_K^{-1}(g_K(a))=a]$, the notebook PC 1 determines that the battery pack 2 is an authorized one, and delivers a connection signal to connection determination means 38. Then, the connection determination means 38 delivers the connection signal to the power source management circuit 6, which in turn connects the power line between the battery pack 2 and the notebook PC 1 to start recharging the battery pack 2. On the other hand, if the comparison means 37 has determined that $[f_K^{-1}(g_K(a)) \neq a]$, the connection determination means 38 outputs a connection reject signal to the power source management circuit 6, so that no power line is connected between the battery pack 2 and the notebook PC 1, and the predetermined procedure causes a warning to appear on the display telling that the pack is an unauthorized one and therefore cannot be used.

The aforementioned authentication system 30 functions not to allow a counterfeit battery pack 2 without authorized rechargeable batteries 3 or authorized functions to connect to the notebook PC 1, thereby preventing glitches or accidents caused by an unauthorized battery pack 2 being installed therein.

Fourth Example

Figure 5:
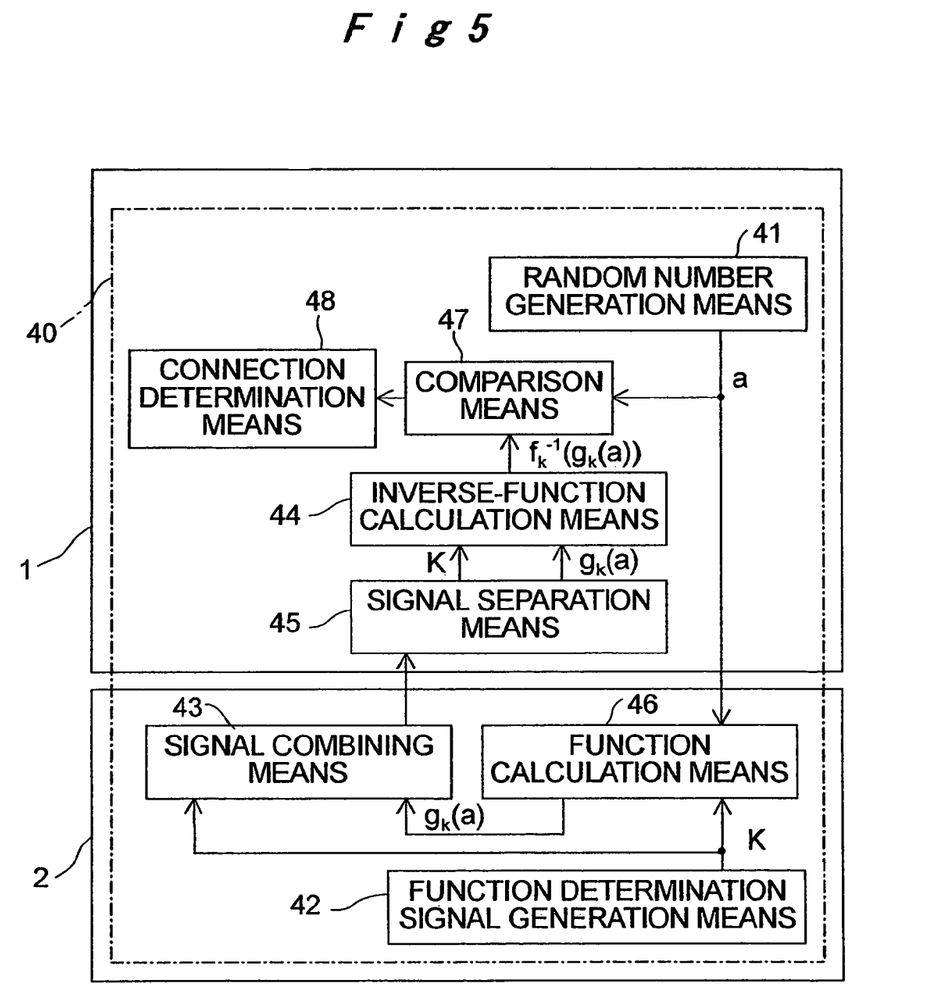
FIG. 5 is a block diagram illustrating the configuration of an authentication system according to a fourth example.

FIG. 5 shows the configuration of an authentication system 40 according to a fourth example, in which the basic configuration of the notebook PC 1 and the battery pack 2 are the same as those of FIG. 1.

Referring to FIG. 5, installing the battery pack 2 in the notebook PC 1 causes the authentication system 40 to start operating. First, a random number "a" generated in random number generation means 41 is transmitted to the battery pack 2 and stored in comparison means 47.

The battery pack 2 allows function calculation means 46 to calculate the function $[g_K(a)]$ of the received random number "a" using one of a plurality of pre-stored function forms corresponding to the function determination signal K delivered from function determination signal generation means 42. The calculation result $[g_K(a)]$ by the function calculation means 46 and the function determination signal K are combined in signal combining means 43 then transmitted back to the notebook PC 1.

The notebook PC 1 allows signal separation means 45 to separate the received combined signal into the calculation result $[g_K(a)]$ by the function calculation means 46 and the function determination signal K. The separated $[g_K(a)]$ and the function determination signal K are supplied to inverse-function calculation means 44, which in turn calculates the inverse function $[f_K^{-1}(g_K(a))]$ of the calculation result $[g_K(a)]$ using one of a plurality of pre-stored function forms corresponding to the function determination signal K. The calculation result of the inverse function is supplied to the comparison means 47 to determine whether $[f_K^{-1}(g_K(a))=a]$.

If the comparison means 47 determines that $[f_K^{-1}(g_K(a))=a]$, the notebook PC 1 determines that the battery pack 2 is an authorized one, and delivers a connection signal to connection determination means 48. Then, the connection determination means 48 delivers the connection signal to the power source management circuit 6, which in turn connects the power line between the battery pack 2 and the notebook PC 1 to start recharging the battery pack 2. On the other hand, if the comparison means 47 has determined that $[f_K^{-1}(g_K(a)) \neq a]$, the connection determination means 48 outputs a connection reject signal to the power source management circuit 6, so that no power line is connected between the battery pack 2 and the notebook PC 1, and the predetermined procedure causes a warning to appear on the display telling that the pack is an unauthorized one and therefore cannot be used.

The aforementioned authentication system 40 functions not to allow a counterfeit battery pack 2 without authorized rechargeable batteries 3 or authorized functions to connect to the notebook PC 1, thereby preventing glitches or accidents caused by an unauthorized battery pack 2 being installed therein.

The foregoing embodiments have been illustrated in relation to the arrangement which employs the notebook PC 1 as an authenticating device and the battery pack 2 connected thereto as an authenticated unit; however, the present invention is not limited thereto but may be similarly implemented in an arrangement in which a user can freely connect a peripheral unit to the main device.

As described above, the authentication system according to the present invention allows for preventing glitches or accidents caused by installing an authenticated unit without prescribed performances and specifications in an authenticating device. This in turn makes it possible to prevent the manufacturer of authorized authenticating devices from losing their credibility or eliminate any damage to users, thereby securing a higher degree of reliability in the installation of a new authenticated unit.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. An authentication system, comprising:
    a host authenticating device;
    a portable authenticated unit connectable to the host authenticating device;
    the host authenticating device having:
        a random number generation device configured to generate a random number;
        a function determination signal generation device configured to generate a function determination signal for determining a function form, the authenticating device being configured to store the random number and the function determination signal; and
        a signal combining device configured to combine the function determination signal and the random number into a combined signal and transmit the combined signal to the authenticated unit;
    the portable authenticated unit having:
        a signal separation device configured to receive the combined signal and to separate the received combined signal into the function determination signal and the random number;
        a second function calculation device configured to calculate a function of the random number as a second calculation result using a determined function form determined by the function determination signal and configured to transmit the second calculation result back to the authenticating device; and
        a battery pack which provides power to the signal separation device and second function calculation device;
    the host authenticating device having:
        an inverse-function calculation device configured receive the second calculation result and to calculate an inverse function of the received second calculation result using a function form determined by the stored function determination signal;
        a comparison device configured to compare the stored random number with the inverse function calculation result; and
        a connecting device configured to effect a function connection of the authenticated unit to the authenticating device if it is detected that the stored random number equals the inverse function calculation result, and to reject the function connection of the authenticated unit to the authenticating device if it is detected that the stored random number does not equal the inverse function calculation result.

2. The authentication system of claim 1, wherein said connecting device is configured to effect a function power signal connection between the portable authenticated unit and the host authenticating device if it is detected that the stored random number equals the inverse function calculation result, and to reject the function power signal connection of the portable authenticated unit to the host authenticating device if it is detected that the stored random number does not equal the inverse function calculation result.

3. A battery pack authentication system for a computer, comprising a portable authenticated battery pack unit and a host authenticating device;
    wherein upon successful authentication of the portable authenticated battery pack unit by the host authenticating device, a power connection is enabled between the portable authenticated battery pack unit and the host authenticating device for powering the computer in the absence of an AC adapter power input and for recharging the portable authenticated battery pack unit in the presence of said AC adapter power input;
    wherein the portable authenticated battery pack unit comprises a battery pack to be authenticated, a signal separation device, and a second function calculation device, the signal separation device and the second function calculation device being powered by said battery pack during authentication of the portable authenticated battery pack unit;
    wherein the host authenticating device is part of the computer and comprises an input for receiving said AC adapter power input, a random number generation device, a function determination signal generation device, a signal combining device, an inverse-function calculation device, a comparison device, and a connecting device;

wherein the random number generation device is configured to generate a random number;

wherein the function determination signal generation device is configured to generate a function determination signal for determining a function form, the host authenticating device being configured to store the random number and the function determination signal;

wherein the signal combining device is configured to combine the function determination signal and the random number into a combined signal and transmit the combined signal to the portable authenticated battery pack unit;

wherein the signal separation device is configured to receive the combined signal and to separate the received combined signal into the function determination signal and the random number;

wherein the second function calculation device is configured to calculate a function of the random number as a second calculation result using a determined function form determined by the function determination signal and configured to transmit the second calculation result back to the host authenticating device; and wherein the inverse-function calculation device is configured to receive the second calculation result and to calculate an inverse function of the received second calculation result using a function form determined by the stored function determination signal;

wherein the comparison device is configured to compare the stored random number with the inverse function calculation result; and wherein the connecting device is configured to enable said power connection between the portable authenticated battery pack unit and the host authenticating device if it is detected that the stored random number equals the inverse function calculation result, and to disable said power connection if it is detected that the stored random number does not equal the inverse function calculation result.

* * * * *